US009211762B1

(12) United States Patent
Tsai

(10) Patent No.: US 9,211,762 B1
(45) Date of Patent: Dec. 15, 2015

(54) CASTOR WITH TWO BRAKING FUNCTIONS

(71) Applicant: Po-Chuan Tsai, Tainan (TW)

(72) Inventor: Po-Chuan Tsai, Tainan (TW)

(*) Notice: Subject to any disclaimer, the term of this patent is extended or adjusted under 35 U.S.C. 154(b) by 0 days.

(21) Appl. No.: 14/682,193

(22) Filed: Apr. 9, 2015

(51) Int. Cl.
*B60B 33/00* (2006.01)

(52) U.S. Cl.
CPC .................................. *B60B 33/0086* (2013.01)

(58) Field of Classification Search
CPC ... Y10T 16/195; Y10T 16/196; Y10T 16/216; B60B 33/0078; B60B 33/0086; B60B 33/02; B60B 33/021; B60B 33/023; B60B 33/025; B60B 33/0042; B60B 2301/046; B60B 2301/0463; B60B 2301/0465; B60B 2301/0467; A61G 2007/0528
See application file for complete search history.

(56) References Cited

U.S. PATENT DOCUMENTS

| 5,368,133 | A   | * | 11/1994 | Yang ............... | B60B 33/0042 16/35 R |
| 5,988,323 | A   | * | 11/1999 | Chu ................. | B60B 33/021 16/35 R |
| 6,360,851 | B1  | * | 3/2002  | Yang ............... | B60B 33/0028 16/35 R |
| 2006/0254867 | A1 | * | 11/2006 | Yan ................. | B60B 33/0021 188/73.1 |
| 2007/0289098 | A1 | * | 12/2007 | Tsai ................ | B60B 33/0042 16/35 R |
| 2009/0019670 | A1 | * | 1/2009  | Tsai ................ | B60B 33/0007 16/35 R |
| 2009/0113671 | A1 | * | 5/2009  | Chu ................. | B60B 33/0002 16/35 R |
| 2010/0170061 | A1 | * | 7/2010  | Lin ................. | B60B 33/0021 16/47 |
| 2010/0263164 | A1 | * | 10/2010 | Lin ................. | B60B 33/0042 16/47 |
| 2012/0317752 | A1 | * | 12/2012 | Dayt ............... | B60B 33/0049 16/35 R |
| 2014/0143982 | A1 | * | 5/2014  | Hamasaki ......... | B60B 33/025 16/35 R |
| 2015/0040352 | A1 | * | 2/2015  | Tsai ................ | B60B 33/0084 16/35 R |

* cited by examiner

*Primary Examiner* — Chuck Mah
(74) *Attorney, Agent, or Firm* — Alan D. Kamrath; Kamrath IP Lawfirm, P.A.

(57) ABSTRACT

A castor includes a castor body provided with an upper slideway, a lower slideway and a projection, two rollers mounted on the castor body, a first braking member pivotally connected with the castor body and provided with a protrusion, a second braking member mounted in the lower slideway, a sliding block mounted in the upper slideway of the castor body, a compression spring biased between the castor body and the sliding block, and a linear spring mounted between the projection of the castor body and the protrusion of the first braking member. Thus, the linear spring provides a restoring force to the protrusion of the first braking member and eliminates the stress applied on the protrusion of the first braking member and the projection of the castor body.

5 Claims, 6 Drawing Sheets

CASTOR WITH TWO BRAKING FUNCTIONS

BACKGROUND OF THE INVENTION

1. Field of the Invention

The present invention relates to a and, more particularly, to a castor with two braking functions.

2. Description of the Related Art

A conventional castor 1 in accordance with the prior art shown in FIGS. 1 and 2 comprises a castor body 11 provided with an upright shaft 111, a transverse shaft 112, an upper slideway 114, a lower slideway 113 and an arcuate projection 116, a gear 115 connected with a lower end of the upright shaft 111 of the castor body 11 to limit rotation of the upright shaft 111, two rollers 12 mounted on two opposite sides of the castor body 11, a first braking member 13 pivotally connected with the castor body 11 by a pivot shaft 131, a second braking member 14 movably mounted in the lower slideway 113 of the castor body 11 and engaging the gear 115, a sliding block 15 slidably mounted in the upper slideway 114 of the castor body 11, a compression spring 16 mounted in the upper slideway 114 of the castor body 11 and biased between the castor body 11 and the sliding block 15. Each of the rollers 12 has an inner face provided with a plurality of locking grooves 121 arranged in an annular manner. The first braking member 13 has an outer face provided with a pedal portion 132. The first braking member 13 has an upper end provided with a press portion 133 abutting the sliding block 15 and a lower end provided with a push portion 136 abutting the second braking member 14. The first braking member 13 is provided with a first arcuate recess 134, a second arcuate recess 135 and a slot 137. The first arcuate recess 134 and the second arcuate recess 135 of the first braking member 13 are selectively mounted on the arcuate projection 116 of the castor body 11. The second braking member 14 has an outer end connected with the push portion 136 of the first braking member 13 and an inner end releasably engaging the gear 115. The sliding block 15 is provided with a plurality of locking pieces 151 detachably locked in the locking grooves 121 of each of the rollers 12.

In operation, when the pedal portion 132 of the first braking member 13 is pressed downward, the first braking member 13 is pivoted clockwise about the pivot shaft 131 and is moved from the position as shown in FIG. 1 to the position as shown in FIG. 2, so that the push portion 136 of the first braking member 13 drives the second braking member 14 to move inward and to engage the gear 115 so as to lock and prevent rotation of the upright shaft 111. At the same time, the press portion 133 of the first braking member 13 is detached from the sliding block 15, so that the sliding block 15 is pushed outward by the restoring force of the compression spring 16, and the locking pieces 151 of the sliding block 15 are moved and locked in the locking grooves 121 of each of the rollers 12 so as to lock and prevent rotation of the rollers 12. At this time, the second arcuate recess 135 of the first braking member 13 is positioned on the arcuate projection 116 of the castor body 11, and the slot 137 of the first braking member 13 is used to buffer the stress applied on the second arcuate recess 135 of the first braking member 13. On the contrary, when the pedal portion 132 of the first braking member 13 is pulled upward, the first braking member 13 is pivoted counterclockwise about the pivot shaft 131 and is moved from the position as shown in FIG. 2 to the position as shown in FIG. 1, so that the push portion 136 of the first braking member 13 drives the second braking member 14 to move outward and to disengage the gear 115 so as to unlock the upright shaft 111. At the same time, the press portion 133 of the first braking member 13 is moved to press the sliding block 15, so that the sliding block 15 is pressed inward, and the locking pieces 151 of the sliding block 15 are moved and detached from the locking grooves 121 of each of the rollers 12 so as to unlock the rollers 12. At this time, the first arcuate recess 134 of the first braking member 13 is positioned on the arcuate projection 116 of the castor body 11, and the slot 137 of the first braking member 13 is used to buffer the stress applied on the first arcuate recess 134 of the first braking member 13. However, the stress between the castor body 11 and the first braking member 13 is concentrated on the first arcuate recess 134 and the second arcuate recess 135 of the first braking member 13, so that the first arcuate recess 134 and the second arcuate recess 135 of the first braking member 13 are easily worn out during a long-term utilization, thereby decreasing the lifetime of the castor 1.

BRIEF SUMMARY OF THE INVENTION

In accordance with the present invention, there is provided a castor comprising a castor body provided with an upright shaft, an upper slideway, a lower slideway and a projection, a gear connected with the upright shaft of the castor body, two rollers mounted on two opposite sides of the castor body, a first braking member pivotally connected with the castor body and provided with a protrusion, a second braking member mounted in the lower slideway of the castor body and engaging the gear, a sliding block mounted in the upper slideway of the castor body, a compression spring mounted in the upper slideway of the castor body and biased between the castor body and the sliding block, and a linear spring mounted between the projection of the castor body and the protrusion of the first braking member. Each of the rollers has an inner face provided with a plurality of locking grooves. The first braking member has an upper end provided with a press portion abutting the sliding block and a lower end provided with a push portion abutting the second braking member. The second braking member has an outer end connected with the push portion of the first braking member and an inner end engaging the gear. The sliding block is provided with a plurality of locking pieces locked in the locking grooves of each of the rollers.

Preferably, the projection of the castor body is provided with a retaining recess, the protrusion of the first braking member is provided with a spring hole, and the linear spring is provided with a first rod inserted into the retaining recess of the projection of the castor body and a second rod mounted in the spring hole of the protrusion of the first braking member.

Preferably, the first rod of the linear spring has a bent distal end.

Preferably, the projection of the castor body is located between the upper slideway and the lower slideway, and the protrusion of the first braking member is located between the press portion and the push portion.

Preferably, the linear spring is biased between the projection of the castor body and the protrusion of the first braking member.

According to the primary advantage of the present invention, the linear spring is mounted between the projection of the castor body and the protrusion of the first braking member to provide a restoring force to the protrusion of the first braking member and to eliminate the stress applied on the protrusion of the first braking member and the projection of the castor body, thereby preventing the protrusion of the first braking member and the projection of the castor body from being worn out during a long-term utilization, and thereby enhancing the lifetime of the castor.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
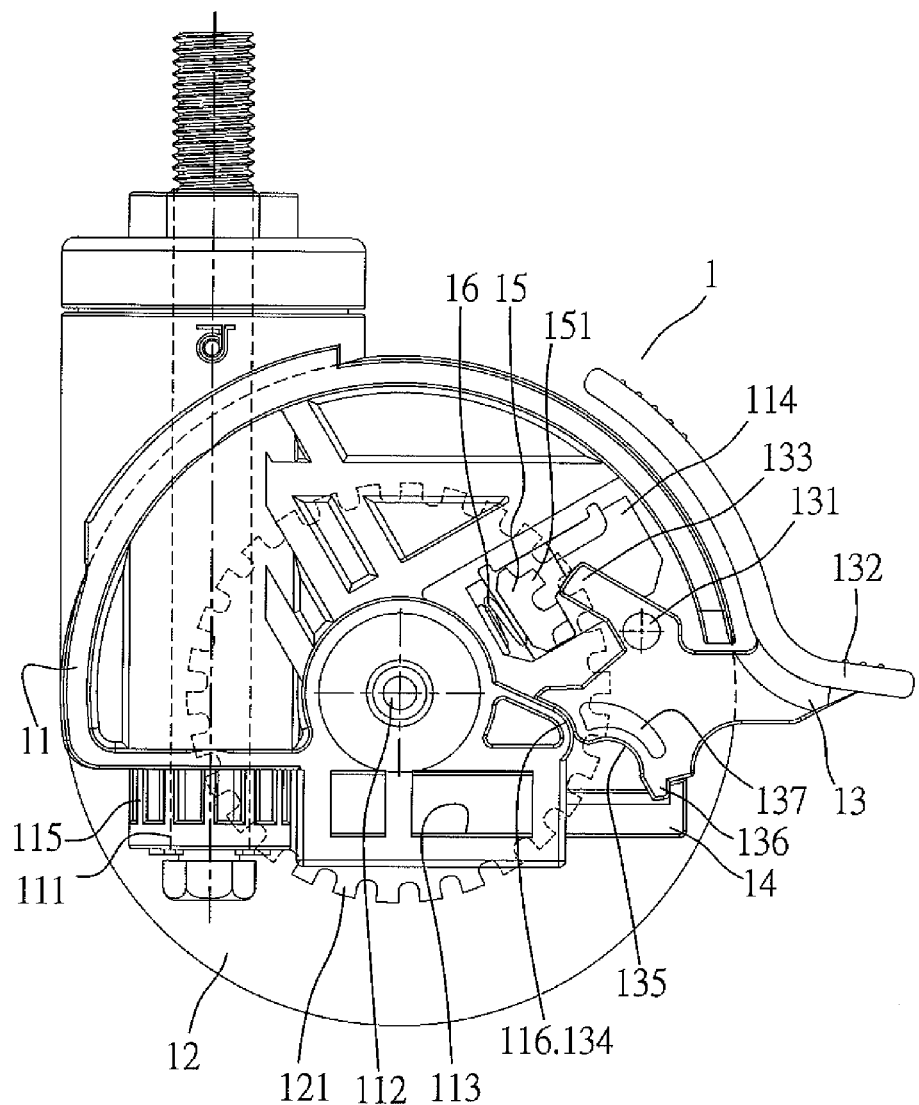
FIG. 1 is aside view of a conventional castor in accordance with the prior art.
Figure 2:
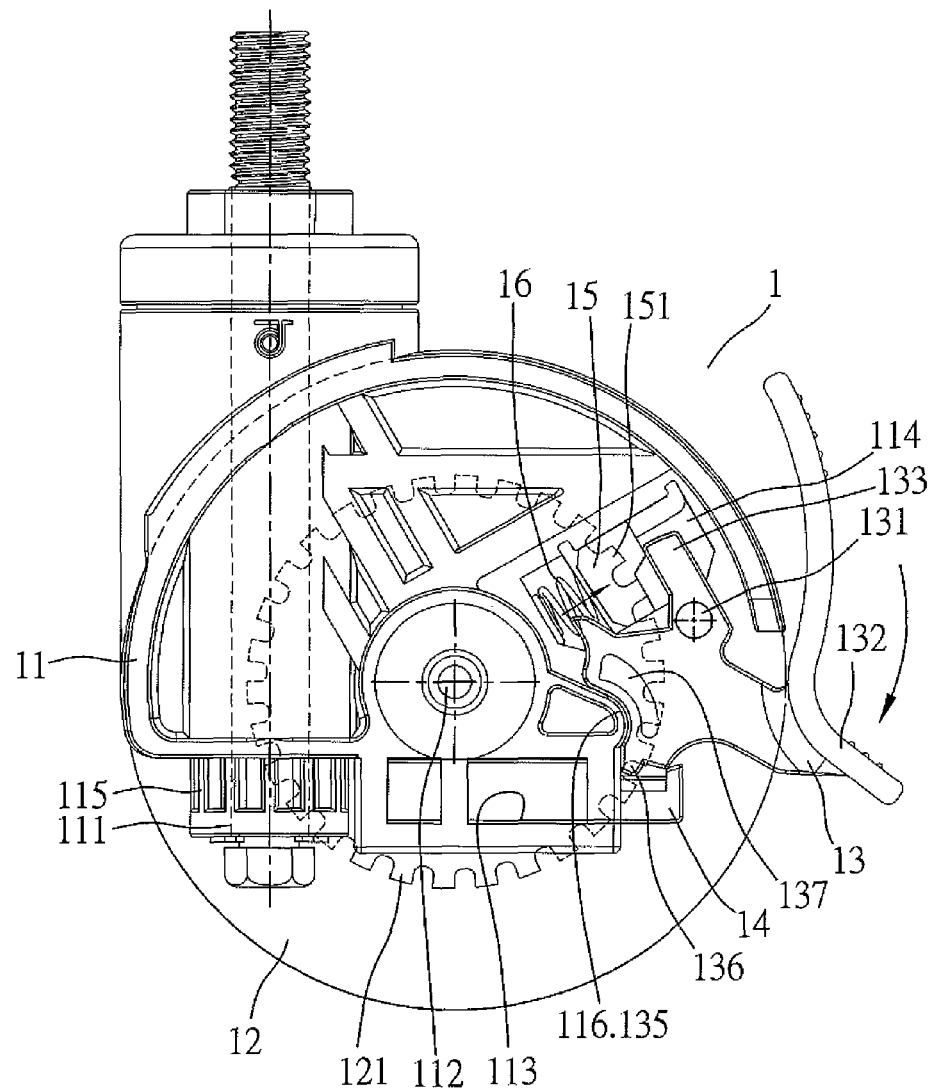
FIG. 2 is a schematic operational view of the conventional castor as shown in FIG. 1.
Figure 3:
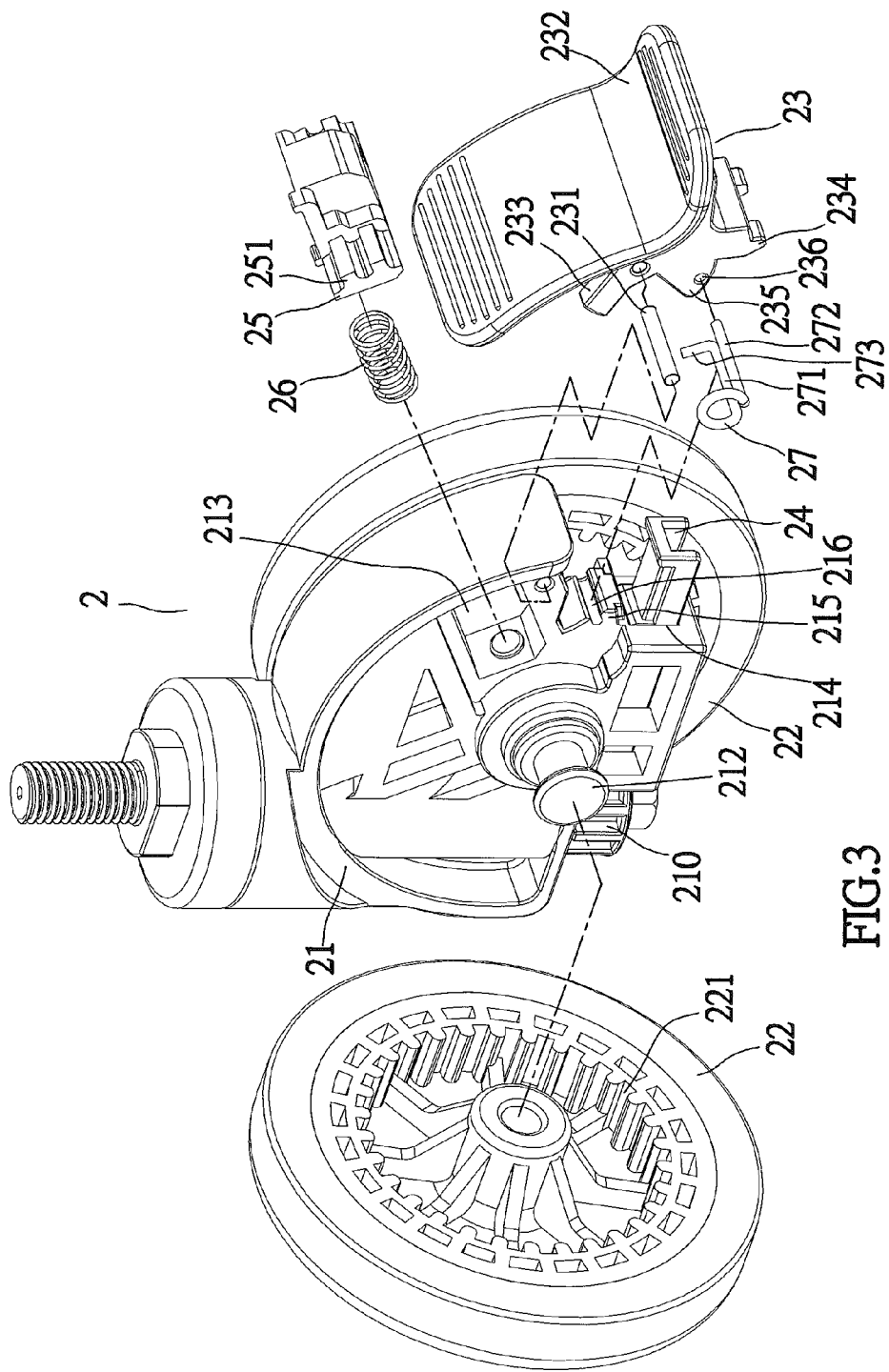
FIG. 3 is an exploded perspective view of a castor in accordance with the preferred embodiment of the present invention.
Figure 4:
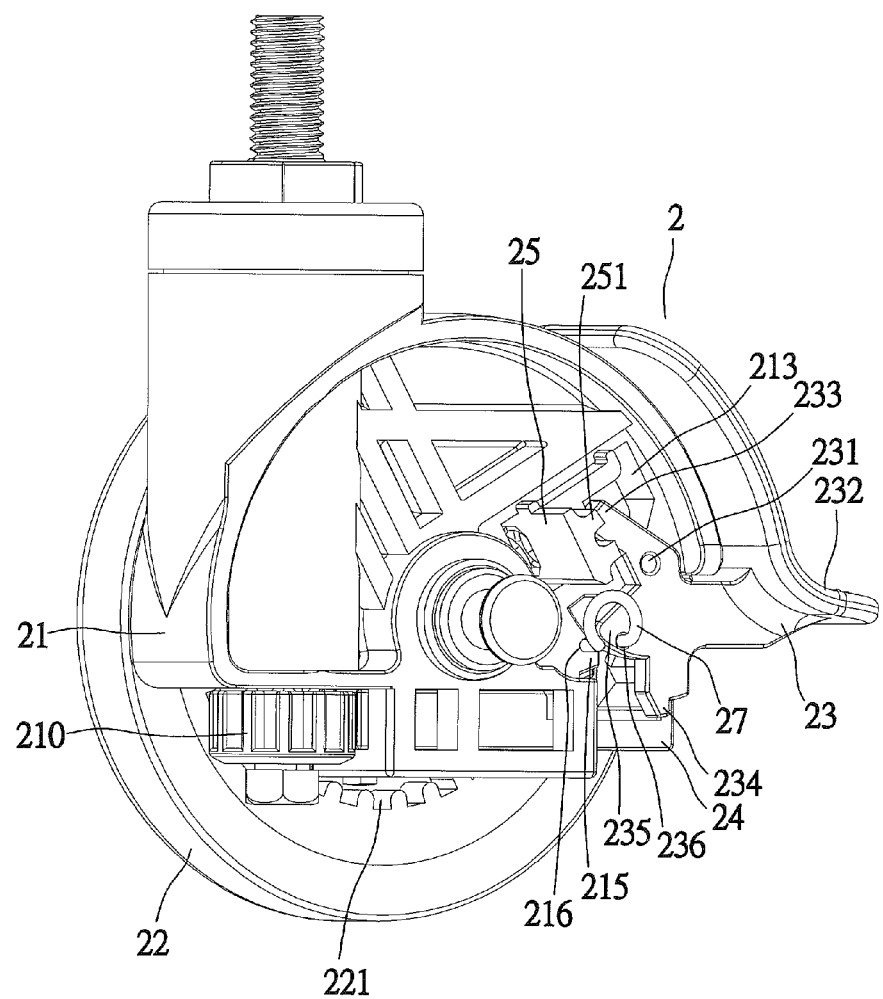
FIG. 4 is a partially perspective assembly view of the castor as shown in FIG. 3.
Figure 5:
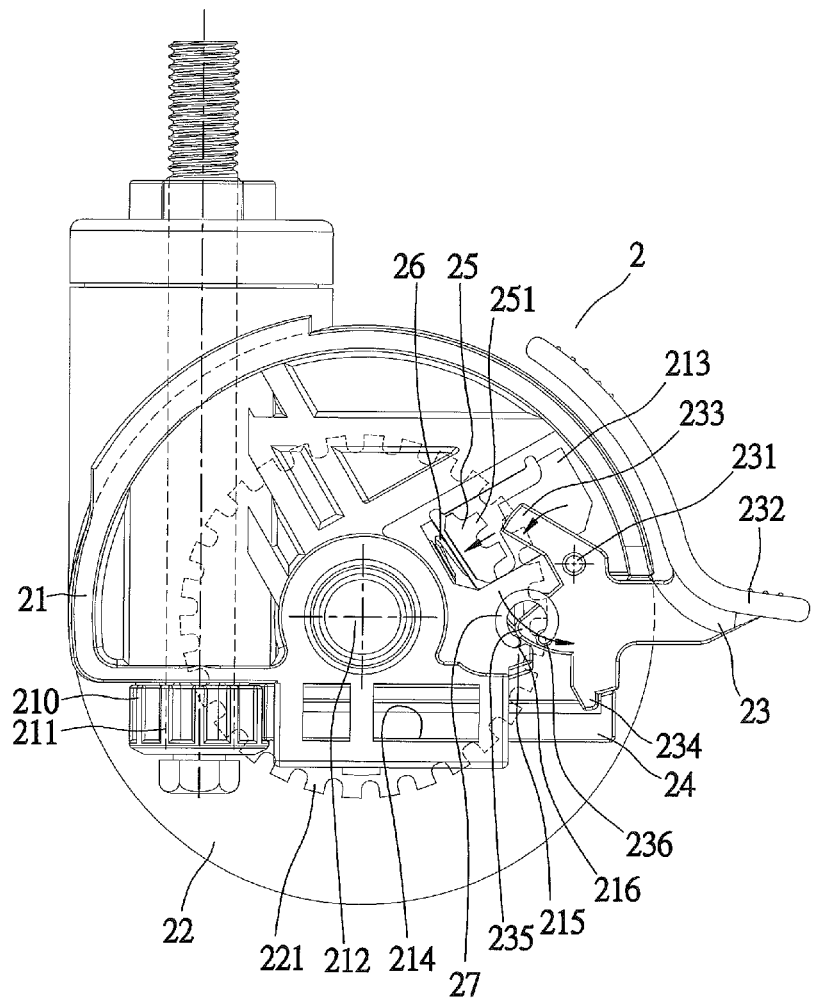
FIG. 5 is a side view of the castor as shown in FIG. 4.

Referring to the drawings and initially to FIGS. 3-5, a castor 2 in accordance with the preferred embodiment of the present invention comprises a castor body 21 provided with an upright shaft 211, a transverse shaft 212, an upper slideway 213, a lower slideway 214 and a projection 215, a gear 210 connected with a lower end of the upright shaft 211 of the castor body 21 to limit rotation of the upright shaft 211, two rollers 22 mounted on two opposite sides of the castor body 21, a first braking member 23 pivotally connected with the castor body 21 and provided with a protrusion 235, a second braking member 24 movably mounted in the lower slideway 214 of the castor body 21 and engaging the gear 210, a sliding block 25 slidably mounted in the upper slideway 213 of the castor body 21, a compression spring 26 mounted in the upper slideway 213 of the castor body 21 and biased between the castor body 21 and the sliding block 25, and a linear spring 27 mounted between the projection 215 of the castor body 21 and the protrusion 235 of the first braking member 23.

The upper slideway 213 of the castor body 21 is located above the transverse shaft 212, and the lower slideway 214 of the castor body 21 is located under the transverse shaft 212. The projection 215 of the castor body 21 is located between the upper slideway 213 and the lower slideway 214 and is provided with a retaining recess 216. Each of the rollers 22 has an inner face provided with a plurality of locking grooves 221 arranged in an annular manner. The first braking member 23 is pivotally connected with the castor body 21 by a pivot shaft 231. The first braking member 23 has an outer face provided with a pedal portion 232. The first braking member 23 has an upper end provided with a press portion 233 abutting the sliding block 25 and a lower end provided with a push portion 234 abutting the second braking member 24. The press portion 233 of the first braking member 23 is located above the pivot shaft 231, and the push portion 234 of the first braking member 23 is located under the pivot shaft 231. The protrusion 235 of the first braking member 23 is located between the press portion 233 and the push portion 234 and is provided with a spring hole 236. The second braking member 24 has an outer end connected with the push portion 234 of the first braking member 23 and an inner end releasably engaging the gear 210. The sliding block 25 is provided with a plurality of locking pieces 251 detachably locked in the locking grooves 221 of each of the rollers 22.

The linear spring 27 is provided with a first rod 271 inserted into the retaining recess 216 of the projection 215 of the castor body 21 and a second rod 272 mounted in the spring hole 236 of the protrusion 235 of the first braking member 23. Thus, the linear spring 27 is biased between the projection 215 of the castor body 21 and the protrusion 235 of the first braking member 23. The first rod 271 of the linear spring 27 has a bent distal end 273 so that the first rod 271 of the linear spring 27 is positioned exactly and solidly in the retaining recess 216 of the projection 215 of the castor body 21.

Figure 6:
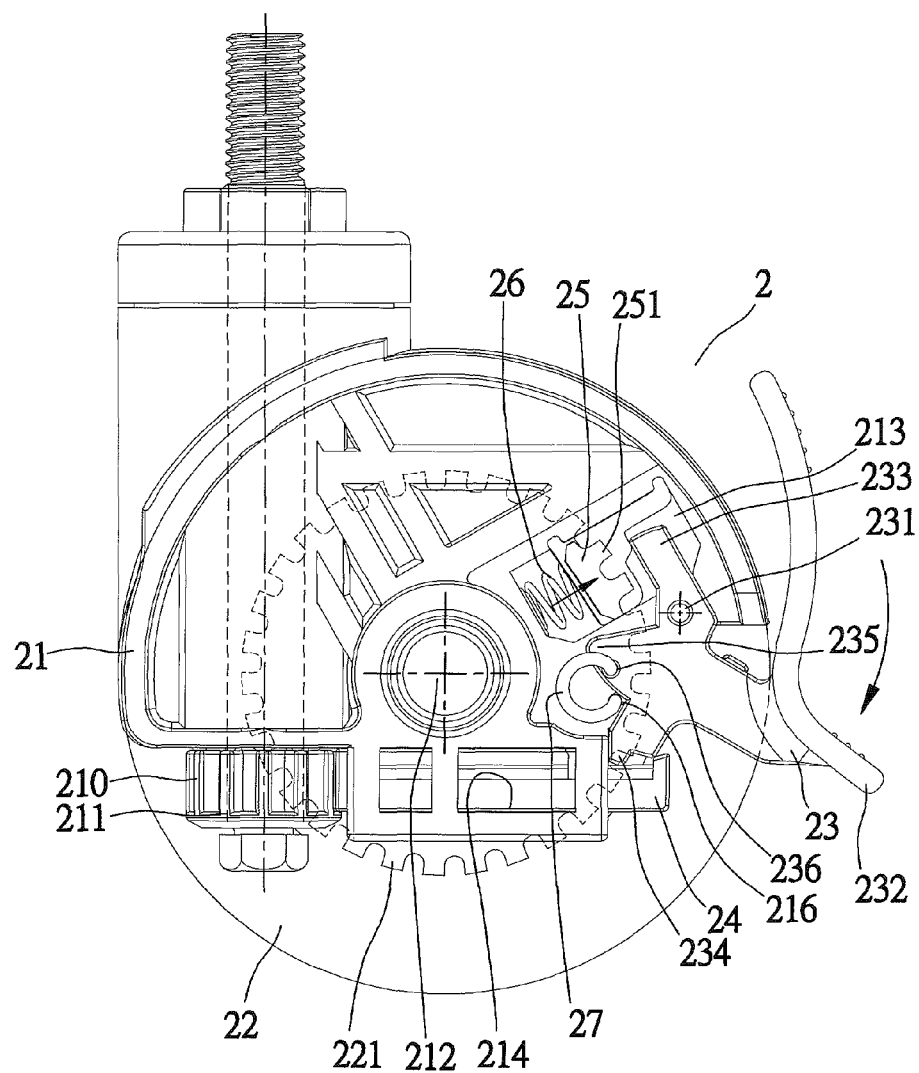
FIG. 6 is a schematic operational view of the castor as shown in FIG. 5.

In operation, referring to FIGS. 5 and 6 with reference to FIGS. 3 and 4, when the pedal portion 232 of the first braking member 23 is pressed downward, the first braking member 23 is pivoted clockwise about the pivot shaft 231 and is moved from the position as shown in FIG. 5 to the position as shown in FIG. 6, so that the push portion 234 of the first braking member 23 drives the second braking member 24 to move inward and to engage the gear 210 so as to lock and prevent rotation of the upright shaft 211. At the same time, the press portion 233 of the first braking member 23 is detached from the sliding block 25, so that the sliding block 25 is pushed outward by the restoring force of the compression spring 26, and the locking pieces 251 of the sliding block 25 are moved and locked in the locking grooves 221 of each of the rollers 22 so as to lock and prevent rotation of the rollers 22. When the first braking member 23 is pivoted clockwise, the protrusion 235 of the first braking member 23 is moved upward to drive the second rod 272 of the linear spring 27, so that the linear spring 27 is pivot about the first rod 271, and the second rod 272 of the linear spring 27 is turned upward. In such a manner, the linear spring 27 that is pivoted and twisted upward will provide a restoring force to the protrusion 235 of the first braking member 23, so that the elastic force of the linear spring 27 can eliminate the stress applied on the protrusion 235 of the first braking member 23 and the projection 215 of the castor body 21, thereby preventing the protrusion 235 of the first braking member 23 and the projection 215 of the castor body 21 from being worn out during a long-term utilization, and thereby enhancing the lifetime of the castor 2.

On the contrary, when the pedal portion 232 of the first braking member 23 is pulled upward, the first braking member 23 is pivoted counterclockwise about the pivot shaft 231 and is moved from the position as shown in FIG. 6 to the position as shown in FIG. 5, so that the push portion 234 of the first braking member 23 drives the second braking member 24 to move outward and to disengage the gear 210 so as to unlock the upright shaft 211. At the same time, the press portion 233 of the first braking member 23 is moved to press the sliding block 25, so that the sliding block 25 is pressed inward, and the locking pieces 251 of the sliding block 25 are moved and detached from the locking grooves 221 of each of the rollers 22 so as to unlock the rollers 22. When the first braking member 23 is pivoted counterclockwise, the protrusion 235 of the first braking member 23 is moved downward to drive the second rod 272 of the linear spring 27, so that the linear spring 27 is pivot about the first rod 271, and the second rod 272 of the linear spring 27 is turned downward. In such a manner, the linear spring 27 that is pivoted and twisted downward will provide a restoring force to the protrusion 235 of the first braking member 23, so that the elastic force of the linear spring 27 can eliminate the stress applied on the protrusion 235 of the first braking member 23 and the projection 215 of the castor body 21, thereby preventing the protrusion 235 of the first braking member 23 and the projection 215 of the castor body 21 from being worn out during a long-term utilization, and thereby enhancing the lifetime of the castor 2.

Accordingly, the linear spring 27 is mounted between the projection 215 of the castor body 21 and the protrusion 235 of the first braking member 23 to provide a restoring force to the protrusion 235 of the first braking member 23 and to eliminate the stress applied on the protrusion 235 of the first braking member 23 and the projection 215 of the castor body 21, thereby preventing the protrusion 235 of the first braking member 23 and the projection 215 of the castor body 21 from being worn out during a long-term utilization, and thereby enhancing the lifetime of the castor 2. In addition, the castor 2 is manufactured easily and simply to decrease the cost of fabrication and production.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

The invention claimed is:

1. A castor comprising:
   a castor body provided with an upright shaft swivelly mounted thereto, an upper slideway, a lower slideway and a projection;
   a gear connected with the upright shaft of the castor body;
   two rollers rotatably mounted on two opposite sides of the castor body;
   a first braking member pivotally connected with the castor body and provided with a protrusion;
   a second braking member slidably mounted in the lower slideway of the castor body and being engageable with the gear;
   a sliding block slidably mounted in the upper slideway of the castor body;
   a compression spring mounted in the upper slideway of the castor body and biased between the castor body and the sliding block; and
   a linear spring mounted between the projection of the castor body and the protrusion of the first braking member;
   wherein:
   each of the rollers has an inner face provided with a plurality of locking grooves;
   the first braking member has an upper end provided with a press portion abutting the sliding block and a lower end provided with a push portion abutting the second braking member;
   the second braking member has an outer end connected with the push portion of the first braking member and an inner end engageable with the gear; and
   the sliding block is provided with a plurality of locking pieces for locking in the locking grooves of each of the rollers.

2. The castor of claim 1, wherein the projection of the castor body is provided with a retaining recess, the protrusion of the first braking member is provided with a spring hole, and the linear spring is provided with a first rod inserted into the retaining recess of the projection of the castor body and a second rod mounted in the spring hole of the protrusion of the first braking member.

3. The castor of claim 2, wherein the first rod of the linear spring has a bent distal end.

4. The castor of claim 1, wherein the projection of the castor body is located between the upper slideway and the lower slideway, and the protrusion of the first braking member is located between the press portion and the push portion.

5. The castor of claim 1, wherein the linear spring is biased between the projection of the castor body and the protrusion of the first braking member.

* * * * *